United States Patent
Leutgeb et al.

(10) Patent No.: US 9,960,818 B2
(45) Date of Patent: May 1, 2018

(54) NEAR FIELD COMMUNICATION CIRCUIT

(71) Applicant: Infineon Technologies AG, Neubiberg (DE)

(72) Inventors: Thomas Leutgeb, Lieboch (AT); Franz Michael Darrer, Graz (AT); Gerald Holweg, Graz (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days. days.

(21) Appl. No.: 15/609,032

(22) Filed: May 31, 2017

(65) Prior Publication Data

US 2017/0346531 A1 Nov. 30, 2017

(30) Foreign Application Priority Data

May 31, 2016 (DE) .................. 10 2016 110 012

(51) Int. Cl.
*H04B 5/00* (2006.01)
*G01K 3/00* (2006.01)

(52) U.S. Cl.
CPC ........... *H04B 5/0037* (2013.01); *G01K 3/005* (2013.01)

(58) Field of Classification Search
CPC ...... H04B 5/0037; H02J 3/1821; H02J 5/005; H02J 7/0013
See application file for complete search history.

(56) References Cited

U.S. PATENT DOCUMENTS

| 9,385,786 | B2 * | 7/2016 | Clement | H02J 7/0052 |
| 2007/0026825 | A1 * | 2/2007 | Wilson | G06K 7/0008 |
| | | | | 455/130 |
| 2017/0040691 | A1 * | 2/2017 | Singh | H02J 7/025 |

FOREIGN PATENT DOCUMENTS

| DE | 102004039649 A1 | 3/2006 |
| DE | 102008009813 A1 | 8/2009 |

* cited by examiner

*Primary Examiner* — Tuan Pham
(74) *Attorney, Agent, or Firm* — Viering, Jentschura & Partner mbB (57) ABSTRACT

A near field communication circuit includes an antenna, a circuit logic unit coupled to the antenna, an energy storage coupled to the antenna, and a shunt control circuit, coupled to the antenna, for controlling a first operating voltage provided for the circuit logic unit by the antenna. The circuit logic unit is set up such that in a first mode of operation the circuit logic unit is operated by the first operating voltage provided by the antenna. The circuit logic unit is set up to control the shunt control circuit such that in the first mode of operation at least some of the electric power provided by the antenna is supplied to the energy storage for the purpose of charging same with the electric power.

23 Claims, 4 Drawing Sheets

NEAR FIELD COMMUNICATION CIRCUIT

CROSS-REFERENCE TO RELATED APPLICATION

This application claims priority to German Patent Application Serial No. 10 2016 110 012.9, which was filed May 31, 2016, and is incorporated herein by reference in its entirety.

TECHNICAL FIELD

Various embodiments relate generally to a near field communication circuit, a communication device and a chip card having a near field communication circuit and a method for operating a near field communication circuit.

BACKGROUND

Near field communication circuits are used for a multiplicity of different applications. Examples are the use of near field communication circuits in identification and payment systems. Near field communication circuits are also used in the industrial sphere, for example for solutions within the context of what is known as "Industry 4.0" or the "Internet of Things". A near field communication circuit can be used in a broad spectrum for control, regulation or generally for power and data transmission.

A standard near field communication circuit, for example an RFID (Radio-Frequency Identification) circuit, can be supplied with power by means of electromagnetic waves and/or fields, for example by magnetic induction. In this case, a near field communication circuit may be exposed to an electromagnetic field that provides the near field communication circuit with more power than it needs. This can damage a conventional near field communication circuit, for example of account of overheating.

SUMMARY

A near field communication circuit includes an antenna, a circuit logic unit coupled to the antenna, an energy storage coupled to the antenna, and a shunt control circuit, coupled to the antenna, for controlling a first operating voltage provided for the circuit logic unit by the antenna. The circuit logic unit is set up such that in a first mode of operation the circuit logic unit is operated by the first operating voltage provided by the antenna. The circuit logic unit is set up to control the shunt control circuit such that in the first mode of operation at least some of the electric power provided by the antenna is supplied to the energy storage for the purpose of charging same with the electric power.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

In the detailed description that follows, reference is made to the accompanying drawings, which form part of this description and, for illustration purposes, show specific embodiments in which the invention can be implemented. In this regard, direction terminology such as, for instance, "at the top", "at the bottom", "at the front", "at the back", "front", "rear", etc., is used with respect to the orientation of the figure(s) described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various embodiments described herein can be combined with one another, unless specifically indicated otherwise. Therefore, the detailed description that follows should not be interpreted in a restrictive sense, and the scope of protection of the present invention is defined by the appended claims.

Within the context of this description, the terms "connected" and "coupled" are used to describe both a direct and an indirect connection and a direct or indirect coupling. In the figures, identical or similar elements are provided with identical reference signs, insofar as this is expedient.

According to various embodiments, one aspect of the disclosure can be considered that of multiple modes of operation being used so that firstly power that is received by an antenna and that is not needed for operating the near field communication circuit is stored for further use instead of resulting in a temperature increase on account of the electrical resistance of the near field communication circuit. Further, a further aspect of the disclosure can be considered that of multiple modes of operation being used so that the near field communication circuit is protected from overheating/damage by virtue of the shunt control circuit, if a corresponding amount of power is received by means of the antenna, being able to reduce or totally block the supply of this power to one or more components of the near field communication circuit. In this case, one or more components of the near field communication circuit can be operated by means of power from the energy storage.

A near field communication circuit is provided in various embodiments for illustrative purposes. It can have a circuit logic unit, for example implemented as a chip, an antenna for transmitting data and power, an energy storage and a shunt control circuit. The near field communication circuit can be operated in at least two modes of operation. On the one hand, if the amount of power that is received by means of the antenna does not exceed a certain value, the near field communication circuit or parts thereof can be supplied with this power. On the other hand, if more power is available then the near field communication circuit needs for operation, the power received by the antenna and forwarded to components of the near field communication circuit can be reduced by means of the shunt control circuit. In such a case, the circuit logic unit can be supplied with power from the energy storage. As such, it is possible to ensure, by way of example, that the circuit logic unit or another component of the near field communication circuit does not receive an excess quantity of power that the circuit logic unit does not need for operation, but that can damage the circuit logic unit, for example on account of overheating.

In various embodiments, a near field communication circuit is provided that can have an antenna, a circuit logic unit coupled to the antenna, an energy storage coupled to the antenna and a shunt control circuit, coupled to the antenna, for controlling a first operating voltage provided for the circuit logic unit by means of the antenna. The circuit logic unit may be set up such that in a first mode of operation the circuit logic unit is operated by the first operating voltage provided by the antenna. Further, the circuit logic unit is set up to control the shunt control circuit such that in the first mode of operation at least some of the electric power provided by the antenna is supplied to the energy storage for the purpose of charging same with the electric power.

By way of example, it is thus possible for power that is not needed for the operation of one or more components of the near field communication circuit to be stored in the energy storage, said power therefore not being converted into heat, for example, on account of the electrical resistance of the near field communication circuit. In other words, the energy storage can act as a connectable electrical load. The power stored in the energy storage can be used for (at least partial) operation of one or more components, for example if the near field communication circuit is operated in the second mode of operation or if the near field communication circuit receives no power or too little power for operation by the antenna.

A near field communication circuit may be set up by means of an antenna for transmitting power and/or data according to a near field communication technology, for example by means of electromagnetic waves and/or by means of electromagnetic fields. By way of example, power and/or data can be transmitted by means of magnetic induction.

A near field communication circuit can have one or more components, for example an antenna, a circuit logic unit, an energy storage and a shunt control circuit. Further, the near field communication circuit can also have further components, such as, by way of example, one or more circuits and integrated circuits, for example a filter circuit or a secure element.

One or more components of the near field communication circuit may be present in a manner integrated with one another or else discretely. By way of example, all components may be present in one module, for example in a chip card module. Further, the one or more components may be electrically and/or mechanically coupled to one another and among one another, arbitrarily as appropriate. One or more components or parts thereof may be implemented, by way of example, in the form of an integrated circuit, for example in a manner integrated on a semiconductor chip.

One or more components of the near field communication circuit may be set up for an operating voltage/operating current or a power that is needed for operation. When power is injected into the near field communication circuit, one or more components of the near field communication circuit and/or electrical connections in and between multiple components can heat up on account of electrical resistance losses. Heating occurs particularly if more power is injected into the near field communication circuit than it, for example than one or more components of the near field communication circuit, needs. The power that the near field communication circuit and/or the one or more components thereof does/do not need, i.e. excess power, can result in a temperature increase in the near field communication circuit and/or the components thereof totally or at least in part on account of electrical resistance losses.

Such a temperature increase can both impair the operation of one or more components and damage these components. Such a temperature increase can also influence the surroundings. Such impairment or damage can affect circuits in the surroundings, for example if the near field communication circuit is part or a module of an electronic device. By way of example, an integrated circuit is typically capable of operation only up to a temperature of ~110° C. Further, such impairment or damage can also affect material in the surroundings, for example if the near field communication circuit is embedded in a material, for example a plastic, or is fitted in the surroundings of this material, which can be deformed or damaged on account of a corresponding temperature.

Impairment of the operation of and damage to a component of the near field communication circuit or the surroundings thereof on account of overheating can be countered by means of multiple modes of operation.

According to various embodiments, in a second mode of operation the circuit logic unit can be operated at least in part by means of a second operating voltage provided by the energy storage.

According to various embodiments, the circuit logic unit may be set up to control the shunt control circuit such that in the second mode of operation the first operating voltage provided by the antenna is reduced. For illustrative purposes, the voltage ($U_c$) applied to the near field communication circuit (for example to the chip) is reduced (in other words the voltage that is present between the interfaces $L_a$ and $L_b$). Reduction can in this case include partial or total reduction (in other words "reduction to 0"; i.e. for illustrative purposes blocking).

By way of example, the shunt control circuit may also be set up to prevent or reduce the supply of power/the operating voltage for one or more other components of the near field communication circuit, for example by a percentage or to a stipulated value. This can prevent one or more components of the near field communication circuit from being supplied with more power than they need for operation, causing them to overheat and hence be subject to influencing of their operation or damage.

According to various embodiments, the circuit logic unit may be set up to control the shunt control circuit such that in the second mode of operation the first operating voltage is altered according to a prescribed timing.

By way of example, the shunt control circuit can cancel a reduction in the first operating voltage, or decrease the reduction, periodically and/or on the basis of a state of charge of the energy storage, so that the energy storage can be recharged for a period. Further, it is thus possible, by way of example, for the circuit logic unit to be used to check whether the power/operating voltage injected by means of the antenna (still) exceeds a threshold value.

According to various embodiments, the circuit logic unit may be set up to supply some of the first operating voltage provided by the antenna to the energy storage when a first switching condition is satisfied.

A first switching condition may be, by way of example, that more power is received by means of the antenna than one or more components (for example apart from the energy storage) need for operation. A switching condition may be based, by way of example, on a threshold value or a percentage. The circuit logic unit may be set up, by way of example, for a comparison of reference values pertaining to instantaneously applied voltages/currents. The energy storage can therefore be charged with power that could otherwise be converted into a temperature increase on account of the electrical resistance of one or more components of the near field communication circuit.

According to various embodiments, the circuit logic unit may be set up to change over from the first mode of operation to the second mode of operation when a second switching condition is satisfied.

According to various embodiments, the second switching condition may be satisfied when/if a prescribed temperature of the near field communication circuit or of surroundings of the near field communication circuit is reached or exceeded and/or when the first operating voltage reaches or exceeds a prescribed threshold value.

A second switching condition may be, by way of example, that more power is injected by means of the antenna than one or more components or parts thereof of the near field communication circuit need and the energy storage is fully charged or at least a portion of the power cannot be used for charging the energy storage, for example on account of the internal resistance of the energy storage.

According to various embodiments, the energy storage can have at least one storage battery.

By way of example, the storage battery can store power in chemical form and thus, for example in comparison with a capacitor, ensure a comparatively long storage period.

According to various embodiments, the energy storage can have at least one capacitor.

A capacitor can, in comparison with a storage battery, have a comparatively short reaction time in order to be able to react to fluctuation of the power supply/an operating voltage.

According to various embodiments, one or more capacitors and/or one or more storage batteries can be used in combination as an energy storage in order to ensure both a long storage period for power and a fast reaction time.

According to various embodiments, the near field communication circuit may be set up according to the near field communication standard ISO/IEC 14443 and/or according to the near field communication standard ISO/IEC 15693 and/or according to the near field communication standard ISO/IEC 18092.

According to various embodiments, a chip card can have a chip card body and a near field communication circuit embedded in the chip card body.

By way of example, at least part of the near field communication circuit may be part of a chip card module. On account of the configuration and modes of operation of the near field communication circuit, it is possible, by way of example, to ensure that firstly the chip card and the surroundings of the chip card, for example a case/storage apparatus, or a reader or one or more materials of the chip card are not deformed/damaged and do not have their operation impaired on account of overheating.

According to various embodiments, a communication device can have a near field communication circuit. Further, the communication device can have a further circuit coupled to the near field communication circuit, wherein the near field communication circuit may be set up to switch to the second mode of operation if the temperature of the further circuit reaches or exceeds a prescribed threshold value.

According to various embodiments, a near field communication circuit can have an antenna, a circuit logic unit coupled to the antenna, an energy storage coupled to the antenna and a shunt control circuit, coupled to the antenna, for controlling a first operating voltage provided for the circuit logic unit by means of the antenna. A method for operating the near field communication circuit can involve the operation of the circuit logic unit in a first mode of operation by means of the first operating voltage provided by the antenna. Further, the circuit logic unit can control the shunt control circuit such that in the first mode of operation some of the first operating voltage provided by the antenna is supplied to the energy storage for the purpose of charging same with electric power.

According to various embodiments, a method can involve operation of the circuit logic unit in a second mode of operation at least in part by means of a second operating voltage provided by the energy storage.

According to various embodiments, a method can involve the circuit logic unit controlling the shunt control circuit such that in the second mode of operation the first operating voltage provided by the antenna is reduced.

According to various embodiments, a method can involve the circuit logic unit controlling the shunt control circuit such that in the second mode of operation the first operating voltage is altered according to a prescribed timing.

According to various embodiments, a method can involve the circuit logic unit supplying some of the first operating voltage provided by the antenna to the energy storage when a first switching condition is satisfied.

According to various embodiments, a method can involve the first switching condition being satisfied when the first operating voltage reaches or exceeds a prescribed threshold value and/or when a state of charge of the energy storage reaches or falls below a prescribed threshold value.

According to various embodiments, a method can involve the circuit logic unit changing over from the first mode of operation to the second mode of operation when a second switching condition is satisfied.

According to various embodiments, a method can involve the second switching condition being satisfied when a prescribed temperature of the near field communication circuit or of surroundings of the near field communication circuit is reached or exceeded and/or when the first operating voltage reaches or exceeds a prescribed threshold value.

Figure 1:
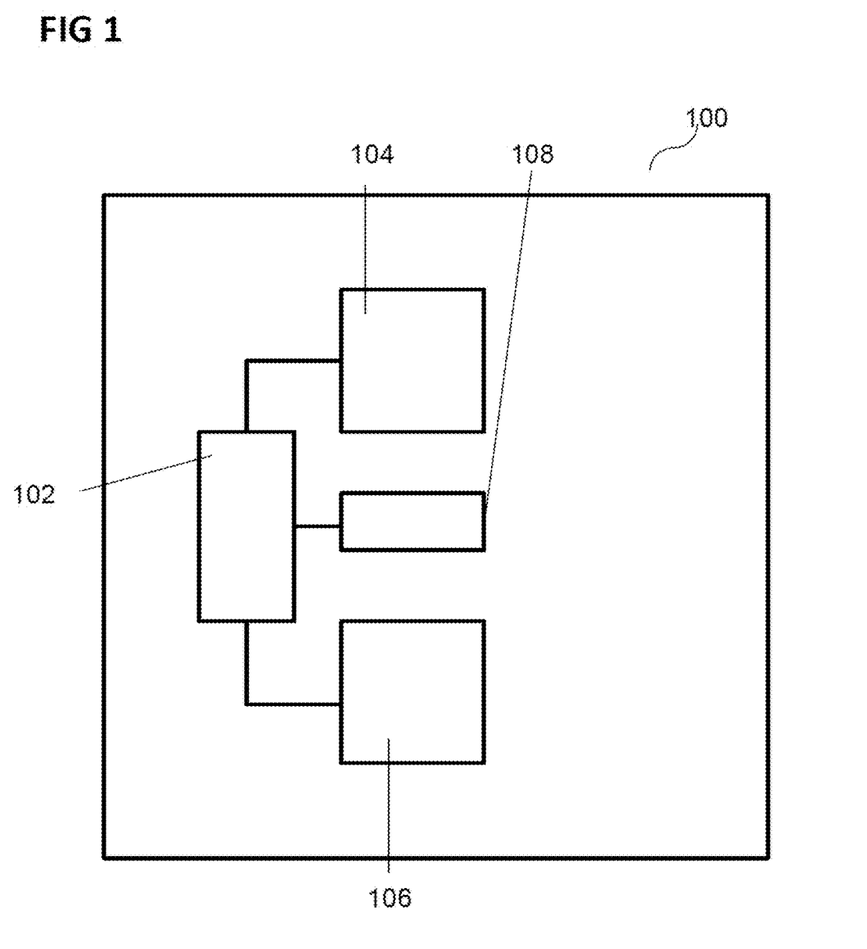
FIG. 1 shows an embodiment of a near field communication circuit.

FIG. 1 shows a schematic block diagram of a near field communication circuit 100.

The near field communication circuit 100 has an antenna 102 that is electrically coupled to a circuit logic unit 104. Further, the near field communication circuit 100 has an energy storage 106 and a shunt control circuit 108 that are each electrically coupled to the antenna 102.

One or more components of the near field communication circuit 100 may be coupled to one another directly, i.e. a communication of data and/or power between at least two components is not received/processed/(at least in part) blocked or forwarded by a further component, and/or at least two components may be coupled to one another indirectly, i.e. a communication of data and/or power between at least two components is received/processed/(at least in part) blocked or forwarded by a further component, which is connected between the at least two components. Accordingly, in various embodiments, one or more electrical couplings of various components of the near field communication circuit 100 can differ from the couplings schematically depicted in FIG. 1.

The near field communication circuit 100 may be set up for a data and/or power transmission according to a near field communication (NFC) technology. By way of example, the near field communication circuit 100 may be an RFID ("Radio-Frequency IDentification") circuit. The near field communication circuit 100 may be designed for one or more frequencies or frequency ranges, such as 10 MHz, 13.56 MHz, 149 MHz, 401 to 406 MHz, 430 to 440 MHz, 863 to 870 MHz and 2.4 GHz, for example. Power and/or data transmission can, by way of example, take place by means of inductive and/or capacitive coupling and/or by means of electromagnetic waves. A near field communication technology may be designed for data and power transmission at short ranges ("proximity" or "near field communication"), for example a few centimeters, or longer ranges ("long range").

In an arrangement or a system, the near field communication circuit 100 can, by way of example, be read by a reader and communicate with another apparatus. The near field communication circuit 100 may be either a fixed component of an apparatus/system, for example of a communication device, or a retrofitted part. By way of example, the near field communication circuit 100 may be part of a chip card, for example according to ISO/IEC 14443 and/or according to ISO/IEC 15693 and/or according to ISO/IEC 18092, or a part/module of a portable computer/phone. One or more or parts of or all components of the near field communication circuit 100 may be present in a manner integrated with one another in one or more assemblies, for example in the form of an integrated circuit.

Applications for the near field communication circuit 100 may be, by way of example, entry and ticket system, payment methods, apparatus for identification or authentication, cryptographic methods or networking of apparatuses, for example within the context of what is known as the "Internet of Things", logistics and/or part of a smartcard/smartphone.

The at least one antenna 102 may, by way of example, be designed for an electromagnetic frequency range by means of the geometric shape of electrical conductors. By way of example, the antenna may be designed as a coil for coupling electromagnetic fields and/or waves (for example by means of magnetic induction in the case of "proximity" and "NFC" applications) or as a dipole for coupling electromagnetic waves (for example in the case of "long range" applications).

The shunt control circuit 108 can have, by way of example, a switch, a transistor or a flip-flop circuit and/or one or more (switchable) electrical resistors. At least part of the shunt control circuit 108 may be present as a switchable electrical connection, for example in the function of a short. The shunt control circuit 108 may be set up to reduce, for example to block, one or more voltages/electric currents on/through one or more components of the near field communication circuit 100. One or more electrical conductors of the shunt control circuit 108 may be designed for heat generation, for example on account of a voltage drop across an electrical resistance of the conductor. As such, the material that one or more conductors of the shunt control circuit 108 include at least in part can differ from one or more materials that, by way of example, other electrical connections of the near field communication circuit 100 include. By way of example, one or more conductors of the shunt control circuit 108 can have a different geometric property, for example a larger cross section, than other electrical connections of the near field communication circuit 100.

The energy storage 106 may be set up to store power permanently or for a period of time. The energy storage 106 can have one or more batteries, for example a printed battery, storage batteries or one or more capacitors. The energy storage 106 can have a combination of different elements, such as, by way of example, a combination of one or more storage batteries and one or more capacitors. The energy storage 106 may be set up to be charged by means of power that has been received by the antenna 102 and to deliver power to one or more components of the near field communication circuit 100.

The circuit logic unit 104 can have one or more circuits, for example one or more integrated circuits. At least part of the circuit logic unit may be present in the form of one or more (semiconductor) chips. The circuit logic unit 104 can have a volatile and/or nonvolatile data memory or be connected thereto. The data memory may be set up to store data about switching conditions/control information, such as one or more temperature, current and voltage values or, generally, threshold values. The circuit logic unit 104 may be part of or connected to a (for example integrated) circuit that may be set up to receive and process the data received by means of the antenna 102.

The circuit logic unit 104 can be supplied at least intermittently with a first operating voltage by means of the antenna 102 or with a second operating voltage by means of the energy storage 106. The circuit logic unit 104 can also be supplied, for example in the case of a comparatively weak electromagnetic field received by the antenna, both with the first and with the second operating voltage. The circuit logic unit may be set up by means of the shunt control circuit 108 to control one or more operating voltages/power supplies to one or more components of the near field communication circuit 100.

The near field communication circuit 100 can be operated in multiple modes of operation. By way of example, the circuit logic unit 104 may be set up to change the modes of operation of the near field communication circuit 100 or to control a change.

In one mode of operation, if no power is received by means of the antenna and/or two little power for operating one or more components of the near field communication circuit 100 is received by means of the antenna, it is possible, for example under the control of the circuit logic unit 104, for the energy storage 106 to be set up to supply one or more components or parts of one or more components of the near field communication circuit 100 with power. By way of example, the near field communication circuit 100 can thus remain active while it awaits a signal from another device, for example another near field communication device such as a reader, or the near field communication circuit 100 can use the power from the energy storage to instruct another near field communication device to ensure a supply of power to the near field communication circuit 100. By way of example, it is possible to change to this mode of operation if the power received by means of the antenna 102 falls below a threshold value.

If no power is received by means of the antenna and/or too little power for operating one or more components of the near field communication circuit 100 is received by means of the antenna 102, the near field communication circuit 100 may also have been/be put into an idle/sleep mode.

In one mode of operation, if power that is sufficient to operate one or more components or parts of one or more components of the near field communication circuit 100 is received by means of the antenna, these one or more components can be operated by means of this power. By way of example, it is possible to change to this mode of operation if the power received by means of the antenna 102 reaches or exceeds a threshold value or if the amount of power received by means of the antenna 102 is in a stipulated range.

In one mode of operation, if more power than is sufficient for operating one or more components or parts of one or more components of the near field communication circuit 100 is received by means of the antenna, the near field communication circuit 100 may be set up to store at least some of the received power in the energy storage 106. By way of example, this can prevent at least some of an excess power from being converted into heat, for example in the form of heat generation on an electrical resistor. Furthermore, it is thus possible for stored power to be used, by way of example, for another mode of operation of the near field communication circuit 100 for operating one or more components (or one or more parts of one or more components). By way of example, it is possible to change to this mode of operation if the power received by means of the antenna 102 reaches or exceeds a threshold value or if the amount of power received by means of the antenna 102 is in a stipulated range.

In one mode of operation, if more power than is sufficient for operating one or more components or parts of one or more components of the near field communication circuit 100 is received by means of the antenna, the near field communication circuit 100 may be set up to reduce or block the supply of power to one or more components. By way of example, the circuit logic unit may be set up to control the shunt control circuit 108 such that all or some of the power received by the antenna 102 does not reach one or more components of the near field communication circuit 100. By way of example, it is possible to change to this mode of operation if the power received by means of the antenna 102 reaches or exceeds a threshold value or if the amount of power received by means of the antenna 102 is in a stipulated range.

By way of example, one mode of operation may be set up to protect the near field communication circuit 100 from a temperature increase or a temperature increase in the surroundings of the near field communication circuit 100. By way of example, it is possible for such an amount of power, for example such a high first operating voltage, to be received by the antenna 102 that the energy storage, for example on account of an internal resistance of the energy storage, is unable to store the power or is able to store only some of it, for example accompanied by heat generation. In this mode of operation, one or more components of parts of one or more components of the near field communication circuit 100 can be operated by means of power that the energy storage 106 can provide.

At least some of the modes of operation described can be combined to form one or more modes of operation. Further, various switching conditions can exist for entry into, maintenance of and/or leaving or changing from one mode of operation to another mode of operation. By way of example, a data memory that is connected to or part of the switching logic unit 104 can store one or more values, e.g. threshold values or value ranges. These values can be compared with instantaneous values, for example ascertained by means of sensors, for example a voltage or a temperature. Depending on the result of the comparison, the switching logic unit 104 may be set up to perform the maintenance of or change from a mode of operation.

According to various embodiments, the near field communication circuit 100 can further have one or more sensors or circuits that can perform a sensor-like function in order to ascertain or at least estimate voltages/electric currents/electric power and/or temperatures. By way of example, the circuit logic unit 104 may be set up to take one or more such ascertained values as a basis for changing or controlling a mode of operation of the near field communication circuit 100.

According to various embodiments, the near field communication circuit 100 can have a security circuit, for example a secure element. A security circuit may be set up to provide one or more security services, and in the process to perform one or more cryptographic methods. Examples of such cryptographic methods are symmetric (for example AES or DES) or asymmetric encryption methods (for example RSA), methods for digital signature or cryptographic hash methods (for example MD2 or MD5). The various modes of operation and an accompanying overvoltage and/or temperature protection can be used to ensure one or more security functions of the security circuit.

According to various embodiments, the near field communication circuit 100 can have at least one filter circuit and/or at least one amplifier circuit. These may be set up to remove interfering influences (for example on account of contactless data and/or power transmission) and/or to boost signals in order to ensure a data transmission. An increased temperature/overheating of the near field communication circuit 100 can, by way of example, impair the operation of a filter or amplifier circuit such that a data transmission is disrupted.

According to various embodiments, the near field communication circuit 100 can have an antenna tuning circuit that may be set up to tune or more communication frequencies of the near field communication circuit 100 and the Q factor of a data and/or power transmission by means of the near field communication circuit 100. An increased temperature/overheating of the near field communication circuit 100 can, by way of example, impair the operation of an antenna tuning circuit such that a target frequency can no longer be (reliably) tuned.

Figure 2:
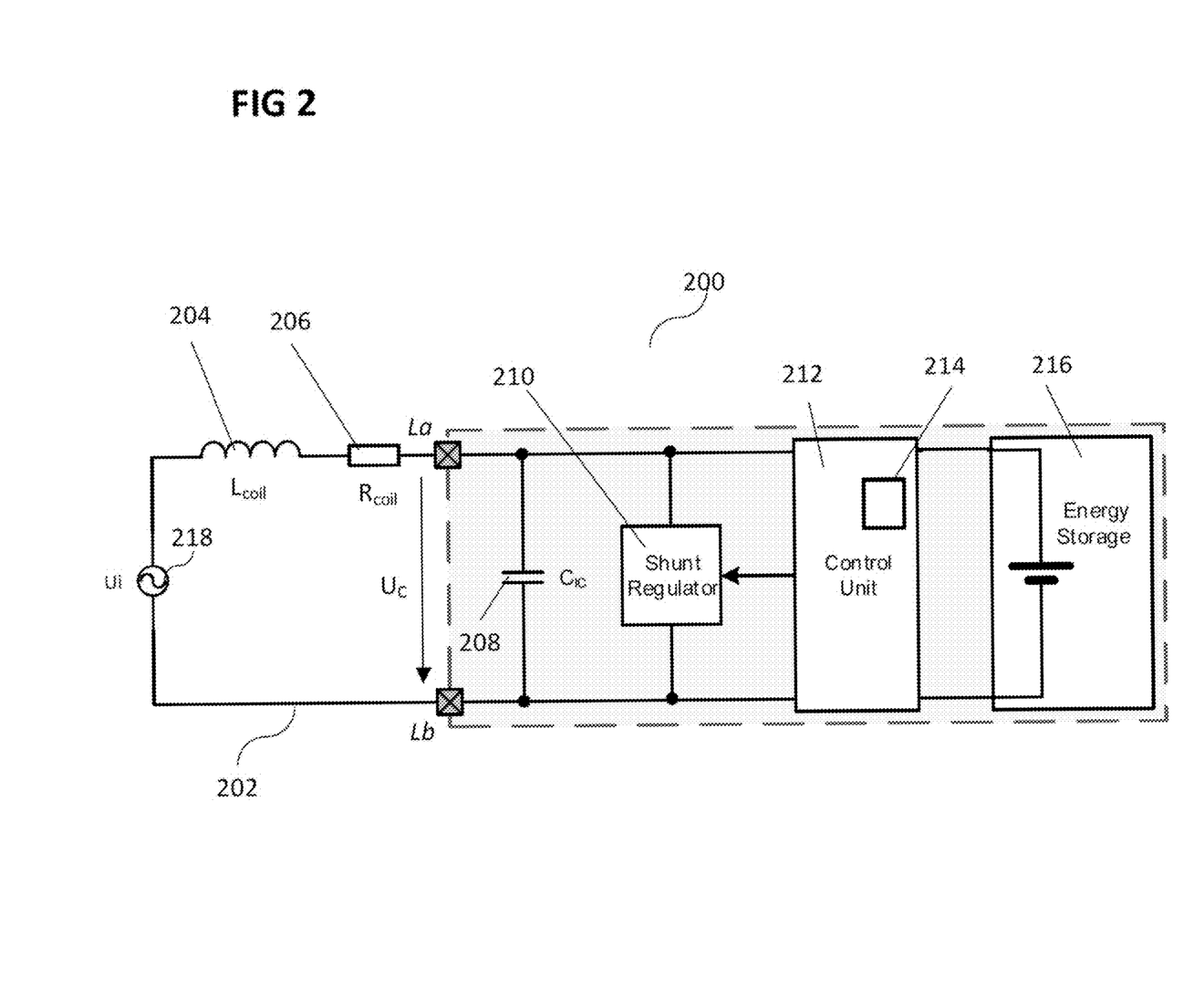
FIG. 2 shows a further embodiment of a near field communication circuit.

FIG. 2 schematically shows an embodiment of a near field communication circuit 200.

The near field communication circuit 200 can have an antenna 202. The antenna 202 can, as depicted as an equivalent circuit diagram here, have an inductance 204 and an electrical resistance 206. Electromagnetic waves and/or fields, for example magnetic induction, can be used to induce a first operating voltage $U_C$ in the antenna 202. The antenna 202 may be coupled by means of the interfaces $L_a$ and $L_b$ to one or more components of the near field communication circuit 200 and thus provide, by way of example, the one or more components with electric current/voltage/electric power, for example the first operating voltage $U_C$. The first operating voltage is applied between the interfaces $L_a$ and $L_b$. In addition, a voltage source 218 is depicted that provides a voltage $U_i$ from which the first operating voltage $U_C$ is formed.

The near field communication circuit 200 can have a capacitor 208. The capacitor 208 can form an electrical resonant circuit in conjunction with the inductance 204 and the electrical resistance 206 of the antenna 202, for example. The value of the inductance 204 and the capacitance of the capacitor 208 can be used to tune the resonant circuit to a target frequency.

The first operating voltage $U_C$ can be applied by means of the two interfaces $L_a$ and $L_b$ to a shunt control circuit 210, a switching logic unit 212 and an energy storage 216. Further, the near field communication circuit 200 can have a switch 214 that may be integrated in the switching logic unit 212/part of the switching logic unit 212, for example.

The shunt control circuit 210 may be set up to short the antenna 202 or the resonant circuit formed by the antenna 202 and the capacitor 208. By way of example, the shunt control circuit 210 can also, instead of shorting an electrical resistance, for example depending on requirements, connect various electrical resistances in parallel with the capacitor 208, for example under the control of the switching logic unit 212. This allows the shunt control circuit 210 to control, for example reduce or totally block, a supply of power to one or more components of the near field communication circuit 200. The shunt control circuit 210 may be set up to ascertain or estimate the voltage dropped across it and/or the current flowing through it. In other words, the shunt control circuit 210 may be a sensor for the switching logic unit 212.

The switching logic unit 212 or a (for example integrated) circuit coupled to the switching logic unit 212 may be set up by means of the antenna 202 for a data transmission according to a near field communication technology. The switching logic unit 212 can control and/or regulate the shunt control circuit 210 and, by way of example, obtain information about voltage values therefrom. Further, the switching logic unit 212 can control the switch 214.

The switch 214 may be set up to interrupt the electric current to the energy storage 216. As such, the switch 214 can control charging of the energy storage 216 and/or delivery of power from the energy storage 216. The switch 214 may be a component of the switching logic unit 212 or alternatively be fitted between the switching logic unit 212 and the shunt control circuit 210 (as a separate component), for example. In various embodiments, the near field communication circuit 200 can have multiple switches that may be set up to isolate or connect one or more respective components of the near field communication circuit 200 from or to a respective supply of power, for example the antenna 202 and/or the energy storage 216. One or more, for example all, of such switches may be controlled by the switching logic unit 212.

The energy storage 216 can have, by way of example, one or more capacitors and/or storage batteries, for example including combinations thereof, for example combinations with various power charging and power delivery characteristics and capacities.

The energy storage 216 and/or the switch 214 may be controlled and/or regulated by the switching logic unit 212. By way of example, the energy storage 216 can transmit to the switching logic unit 212, for example at the request of the switching logic unit 212, a piece of information about the state of charge of the energy storage 216.

Figure 3A:
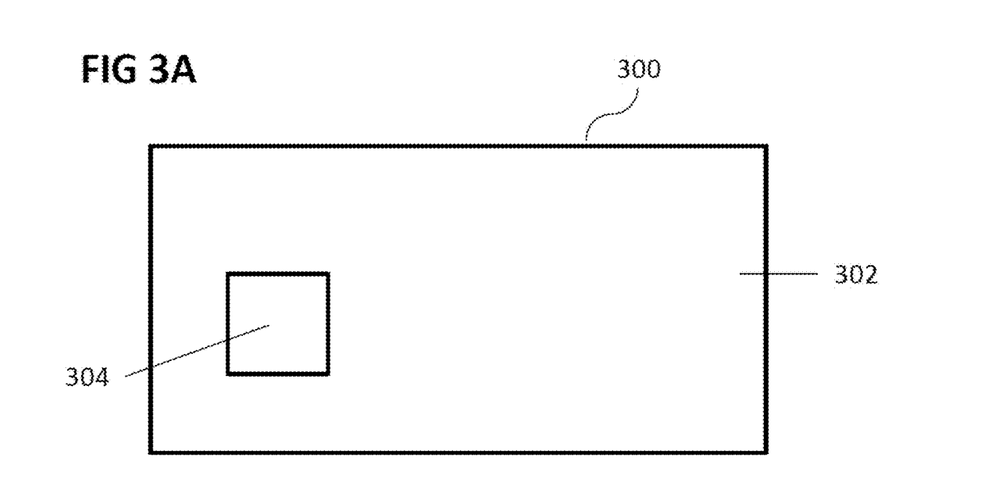
FIG. 3A shows an embodiment of a chip card with a near field communication circuit.

FIG. 3A schematically shows a chip card 300 with a near field communication circuit 304.

The chip card 300 can have a chip card body 302 and the near field communication circuit 304.

By way of example, all or part of the near field communication circuit 304 is integrated in a chip card module. The near field communication circuit 304 may be designed, by way of example, for a read/write mode and/or a peer-to-peer mode and/or a card emulation mode or combinations of the modes. By way of example, the near field communication circuit 304 can be operated with one or more of the modes of operation described above and as such also protect the chip card body 302 from deformation on account of a temperature change, for example.

Figure 3B:
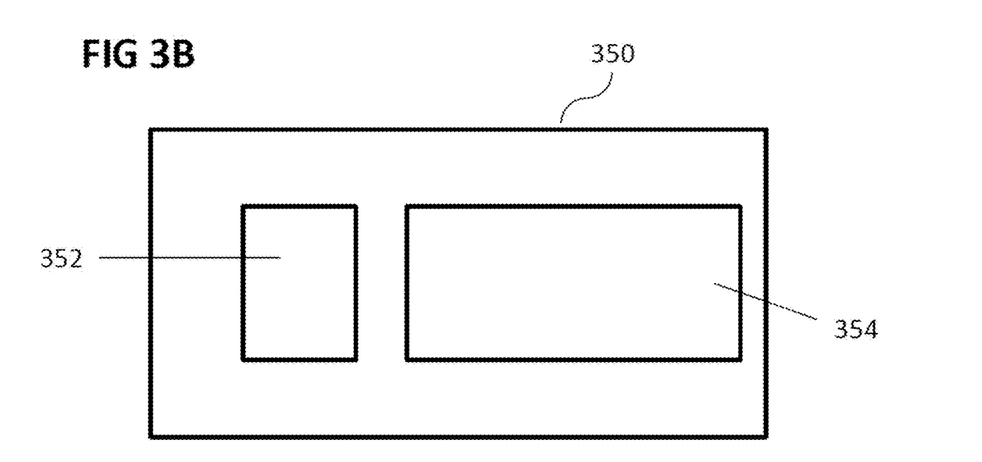
FIG. 3B shows an embodiment of a communication device with a near field communication circuit.

FIG. 3B schematically shows a communication device 350 with a near field communication circuit 352.

The communication device 350 can have both the near field communication circuit 352 and a further circuit 354. The further circuit 354 may be coupled or may not be coupled to the near field communication circuit 352. The near field communication circuit 352 may be set up to ascertain a piece of information about the temperature, for example by means of a sensor in the further circuit 354 or in the near field communication circuit 352.

According to various embodiments, the communication device may be, by way of example, a portable device having microprocessors, for example application processors. Examples are mobile phones, smartphones, PDAs, tablet computers, notebooks, laptops, ultrabooks, small and extremely small computers, smartwatches, wearables (electronics embedded in textiles), data goggles and other devices that fall into the categories "Augmented Reality" and "Virtual Reality".

The near field communication circuit 352 may be set up to protect components of the communication device 350, for example a storage battery of a smartphone, from a temperature increase.

Figure 4:
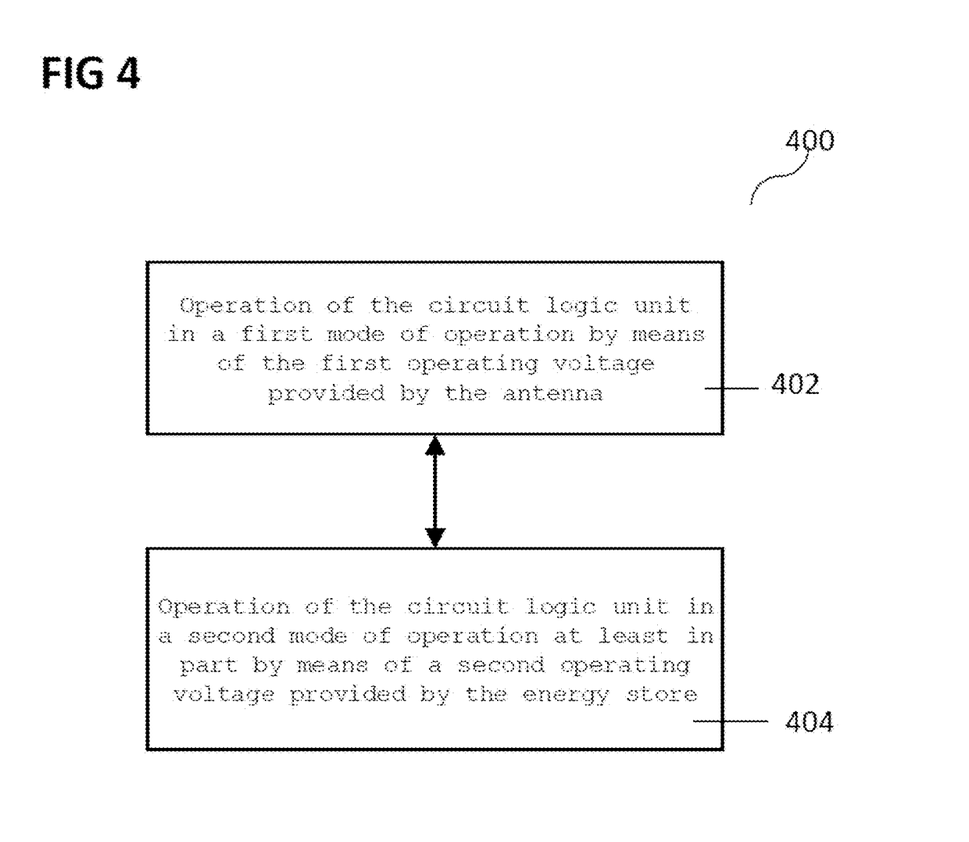
FIG. 4 shows an embodiment of a method for operating a near field communication circuit.

FIG. 4 shows a schematic block diagram of a method for operating a near field communication circuit 400.

The method can, as described in blocks 402 and 404, involve the near field communication circuit 400 being able to be operated in at least two different modes of operation. The double-headed arrow between blocks 402 and 404 is intended to convey that the modes of operation can change.

The near field communication circuit 400 can have an antenna, a circuit logic unit coupled to the antenna, an energy storage coupled to the antenna and a shunt control circuit, coupled to the antenna, for controlling a first operating voltage provided for the circuit logic unit by means of the antenna.

The method can involve the operation of the circuit logic unit in a first mode of operation by means of the first operating voltage provided by the antenna. Further, the method can involve the operation of the circuit logic unit in a second mode of operation at least in part by means of a second operating voltage provided by the energy storage.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A near field communication circuit, comprising:
    an antenna;
    a circuit logic unit coupled to the antenna;
    an energy storage coupled to the antenna; and
    a shunt control circuit, coupled to the antenna, for controlling a first operating voltage provided for the circuit logic unit by the antenna,
    wherein the circuit logic unit is set up such that in a first mode of operation the circuit logic unit is operated by the first operating voltage provided by the antenna, and
    wherein the circuit logic unit is set up to control the shunt control circuit such that in the first mode of operation at least some electric power provided by the antenna is supplied to the energy storage for charging the same with the electric power.

2. The near field communication circuit of claim 1, wherein in a second mode of operation the circuit logic unit is operated at least in part by a second operating voltage provided by the energy storage.

3. The near field communication circuit of claim 2,
wherein the circuit logic unit is set up to control the shunt control circuit such that in the second mode of operation the first operating voltage provided by the antenna is reduced.

4. The near field communication circuit of claim 3,
wherein the circuit logic unit is set up to control the shunt control circuit such that in the second mode of operation the first operating voltage is altered according to a prescribed timing.

5. The near field communication circuit of claim 1,
wherein the circuit logic unit is set up to supply some of the first operating voltage provided by the antenna to the energy storage when a first switching condition is satisfied.

6. The near field communication circuit of claim 5,
wherein the first switching condition is satisfied at least one of when the first operating voltage reaches or exceeds a prescribed threshold value or when a state of charge of the energy storage reaches or falls below a prescribed threshold value.

7. The near field communication circuit of claim 2,
wherein the circuit logic unit is set up to change over from the first mode of operation to the second mode of operation when a second switching condition is satisfied.

8. The near field communication circuit of claim 7,
wherein the second switching condition is satisfied at least one of when a prescribed temperature of the near field communication circuit or of surroundings of the near field communication circuit is reached or exceeded or when the first operating voltage reaches or exceeds a prescribed threshold value.

9. The near field communication circuit of claim 1,
wherein the energy storage has at least one storage battery.

10. The near field communication circuit of claim 1,
wherein the energy storage has at least one capacitor.

11. The near field communication circuit of claim 1,
wherein the near field communication circuit is set up according to a standard selected from a group consisting of:
the near field communication standard ISO/IEC 14443,
the near field communication standard ISO/IEC 15693, and
the near field communication standard ISO/IEC 18092.

12. A chip card, comprising:
a chip card body; and
a near field communication circuit, comprising:
an antenna;
a circuit logic unit coupled to the antenna;
an energy storage coupled to the antenna; and
a shunt control circuit, coupled to the antenna, for controlling a first operating voltage provided for the circuit logic unit by the antenna,
wherein the circuit logic unit is set up such that in a first mode of operation the circuit logic unit is operated by the first operating voltage provided by the antenna,
wherein the circuit logic unit is set up to control the shunt control circuit such that in the first mode of operation at least some electric power provided by the antenna is supplied to the energy storage for charging the same with the electric power, and
wherein the near field communication circuit is embedded in the chip card body.

13. A communication device, comprising:
a near field communication circuit, comprising:
an antenna;
a circuit logic unit coupled to the antenna;
an energy storage coupled to the antenna;
a shunt control circuit, coupled to the antenna, for controlling a first operating voltage provided for the circuit logic unit by the antenna;
wherein the circuit logic unit is set up such that in a first mode of operation the circuit logic unit is operated by the first operating voltage provided by the antenna;
wherein the circuit logic unit is set up to control the shunt control circuit such that in the first mode of operation at least some electric power provided by the antenna is supplied to the energy storage for charging the same with the electric power; and
a further circuit coupled to the near field communication circuit,
wherein the near field communication circuit is set up to switch to a second mode of operation if a temperature of the further circuit reaches or exceeds a prescribed threshold value.

14. A method for operating a near field communication circuit,
wherein the near field communication circuit comprises:
an antenna;
a circuit logic unit coupled to the antenna;
an energy storage coupled to the antenna;
a shunt control circuit, coupled to the antenna, for controlling a first operating voltage provided for the circuit logic unit by the antenna;
wherein the method comprises:
operating the circuit logic unit in a first mode of operation by the first operating voltage provided by the antenna; and
controlling, by the circuit logic unit, the shunt control circuit such that in the first mode of operation some of the first operating voltage provided by the antenna is supplied to the energy storage for charging the same with electric power.

15. The method of claim 14, further comprising:
operating the circuit logic unit in a second mode of operation at least in part by a second operating voltage provided by the energy storage.

16. The method of claim 15,
wherein the circuit logic unit controls the shunt control circuit such that in the second mode of operation the first operating voltage provided by the antenna is reduced.

17. The method of claim 16,
wherein the circuit logic unit controls the shunt control circuit such that in the second mode of operation the first operating voltage is altered according to a prescribed timing.

18. The method of claim 14,
wherein the circuit logic unit supplies some of the first operating voltage provided by the antenna to the energy storage when a first switching condition is satisfied.

19. The method of claim 18,
wherein the first switching condition is satisfied when the first operating voltage reaches or exceeds a prescribed threshold value.

20. The method of claim 18,
wherein the first switching condition is satisfied when a state of charge of the energy storage reaches or falls below a prescribed threshold value.

21. The method of claim 15,
wherein the circuit logic unit changes over from the first mode of operation to the second mode of operation when a second switching condition is satisfied.

22. The method of claim 21,
wherein the second switching condition is satisfied when a prescribed temperature of the near field communication circuit or of surroundings of the near field communication circuit is reached or exceeded.

23. The method of claim 21,
wherein the second switching condition is satisfied when the first operating voltage reaches or exceeds a prescribed threshold value.

* * * * *